(12) United States Patent　　　　(10) Patent No.:　US 12,597,325 B2

Tinkle　　　　　　　　　　　　　　(45) Date of Patent:　　　Apr. 7, 2026

(54) COIN ANTI-THEFT DEVICE

(71) Applicant: Darryl Tinkle, Sonora, CA (US)

(72) Inventor: Darryl Tinkle, Sonora, CA (US)

( * ) Notice:　Subject to any disclaimer, the term of this patent is extended or adjusted under 35 U.S.C. 154(b) by 16 days.

(21) Appl. No.: 18/733,114

(22) Filed:　Jun. 4, 2024

(65)　　　　　Prior Publication Data

US 2025/0371950 A1　Dec. 4, 2025

(51) Int. Cl.
| | |
|---|---|
| *G08B 13/14* | (2006.01) |
| *B65D 1/34* | (2006.01) |
| *B65D 59/04* | (2006.01) |
| *G01S 19/16* | (2010.01) |

(52) U.S. Cl.
CPC ............. *G08B 13/149* (2013.01); *B65D 1/34* (2013.01); *B65D 59/04* (2013.01); *G01S 19/16* (2013.01)

(58) Field of Classification Search
None
See application file for complete search history.

(56)　　　　　References Cited

U.S. PATENT DOCUMENTS

| | | | | |
|---|---|---|---|---|
| 4,595,100 | A * | 6/1986 | Chabot | .................. G07D 9/004 |
| | | | | 229/93 |
| D399,540 | S | 10/1998 | Wolfenstein | |
| 7,656,292 | B2 | 2/2010 | Bartholf | |
| 8,177,089 | B1 * | 5/2012 | Bishop | .................. B65D 55/12 |
| | | | | 220/214 |
| 8,217,791 | B2 | 7/2012 | Grimm | |

| | | | | |
|---|---|---|---|---|
| 10,360,754 | B2 | 7/2019 | Phillips | |
| 2002/0070874 | A1 | 6/2002 | Williams | |
| 2006/0220845 | A1 * | 10/2006 | Agrawal | ................. G08B 13/08 |
| | | | | 340/5.9 |
| 2009/0201152 | A1 * | 8/2009 | Karr | ..................... G06Q 10/087 |
| | | | | 340/572.1 |
| 2009/0308771 | A1 * | 12/2009 | Sparling | ................. B65D 59/04 |
| | | | | 206/427 |
| 2011/0018707 | A1 * | 1/2011 | Dobson | ................... G08B 13/08 |
| | | | | 340/572.1 |
| 2011/0260869 | A1 * | 10/2011 | Gagnon | .................. G08B 13/08 |
| | | | | 340/572.1 |
| 2013/0278411 | A1 * | 10/2013 | DiBella | .................... G10G 7/00 |
| | | | | 70/14 |
| 2017/0345282 | A1 * | 11/2017 | Farrell | ...................... G08B 1/08 |
| 2019/0355238 | A1 * | 11/2019 | Brinkley | ................ G08B 21/02 |
| 2021/0312775 | A1 | 10/2021 | Marinelli, Sr. | |

(Continued)

FOREIGN PATENT DOCUMENTS

WO　　　　WO03029929　　　4/2003

*Primary Examiner* — Muhammad Adnan

(57)　　　　　ABSTRACT

A coin anti-theft device for tracking a location of stolen coins to facilitate apprehension of thieves and recovery of stolen property includes a sleeve. A plurality of coins is positioned within the sleeve. A processor is positioned within the sleeve. A global positioning system transceiver is electrically coupled to the processor. The global positioning system transceiver is designed to wirelessly communicate with a global positioning system unit wherein the global positioning system transceiver is designed to identify a geographic location of the sleeve. A wireless communication transmitter is electrically coupled to the processor. The wireless communication transmitter is designed to wirelessly communicate with an electronic device wherein the wireless communication transmitter is designed to send the geographic location of the sleeve to the electronic device.

11 Claims, 5 Drawing Sheets

(56)        References Cited

U.S. PATENT DOCUMENTS

| | | | | |
|---|---|---|---|---|
| 2022/0130198 A1* | 4/2022 | Mclachlan | ............. | B65D 27/22 |
| 2022/0391836 A1* | 12/2022 | Shamoon | ................ | H04W 4/80 |
| 2023/0011993 A1* | 1/2023 | McCain | ................ | G08B 21/24 |
| 2023/0410971 A1* | 12/2023 | McCain | ................ | G16H 40/63 |

* cited by examiner

58

10

12

26

COIN ANTI-THEFT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tracking systems and more particularly pertains to a new tracking system for tracking a location of stolen coins to facilitate apprehension of thieves and recovery of stolen property.

(2) Description of Related Art Including Information Disclosed Under 37 CFR 1.97 and 1.98

The prior art relates to tracking systems. More specifically, the prior art relates to tracking and security systems for use in locating and apprehending bank robbers, and for use in recovering stolen currency. A common type of currency security system is a dye pack, which can be disguised within bundles of paper currency and handed out by bank tellers to bank robbers during the course of a robbery. Such dye packs are often nearly indistinguishable from genuine bundles of paper currency, making them easy to include with the stolen currency. However, such dye packs are not available to other users, such as gas stations or department stores, which are also often targeted for robberies. Moreover, the use of dye packs has become well-known. Finally, although the explosion of dye packs can provide visual confirmation that certain pieces of paper currency have been stolen, dye packs do not typically help law enforcement track and locate the robbers. Thus, there is a need for a security device that includes a location tracking device to facilitate law enforcement in locating and apprehending robbers. Ideally, the tracking device would be hidden within legitimate currency so that the robbers are unaware the tracking device is being used to find their location. Such a device would also ideally be designed for use by the general public, so that all vendors can use the security device to recover stolen currency and apprehend robbers.

BRIEF SUMMARY OF THE INVENTION

An embodiment of the disclosure meets the needs presented above by generally comprising a sleeve. A plurality of coins is positioned within the sleeve. A processor is positioned within the sleeve. A global positioning system transceiver is electrically coupled to the processor. The global positioning system transceiver is configured to wirelessly communicate with a global positioning system unit wherein the global positioning system transceiver is configured to identify a geographic location of the sleeve. A wireless communication transmitter is electrically coupled to the processor. The wireless communication transmitter is configured to wirelessly communicate with an electronic device wherein the wireless communication transmitter is configured to send the geographic location of the sleeve to the electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
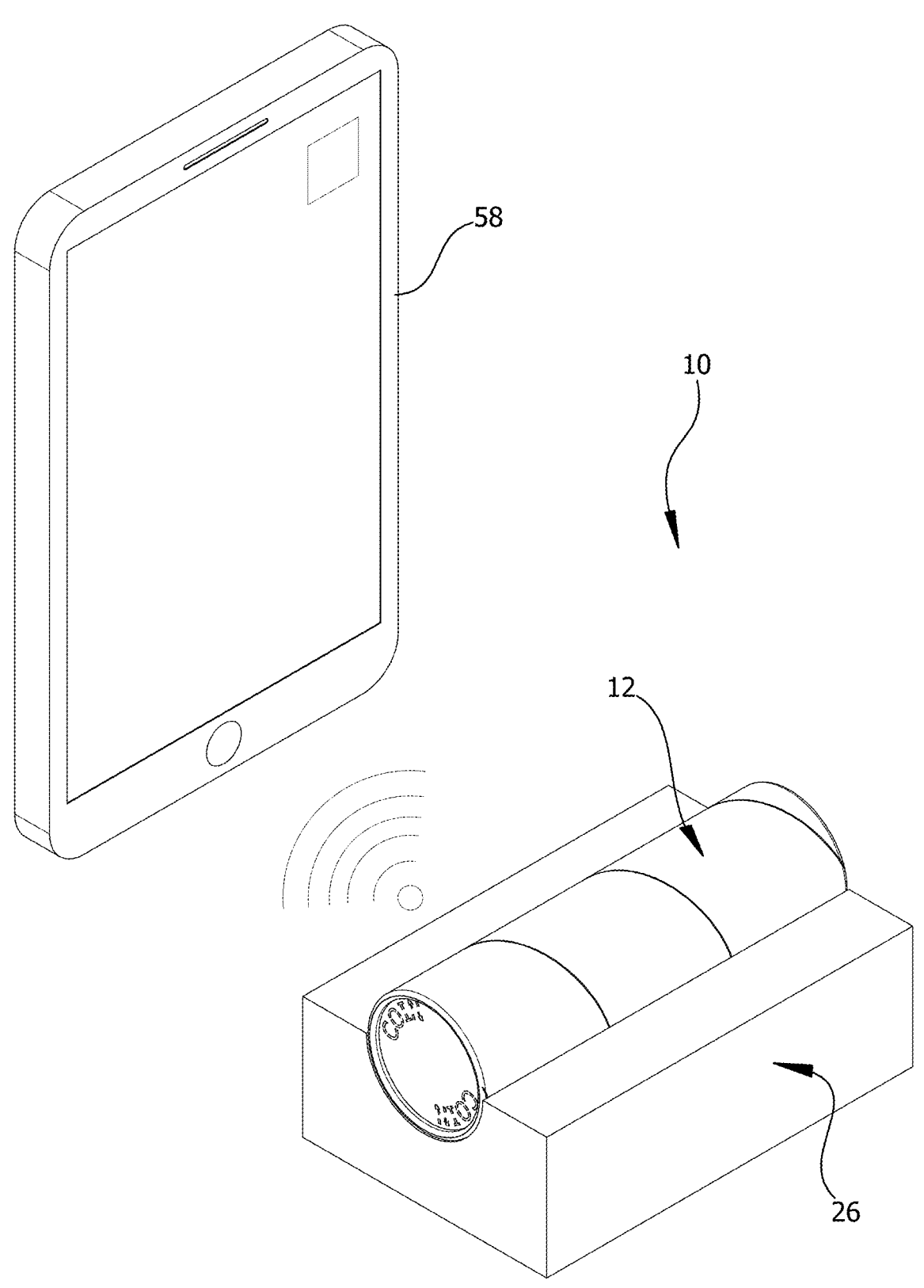
FIG. 1 is an isometric view of a coin anti-theft device according to an embodiment of the disclosure.
Figure 2:
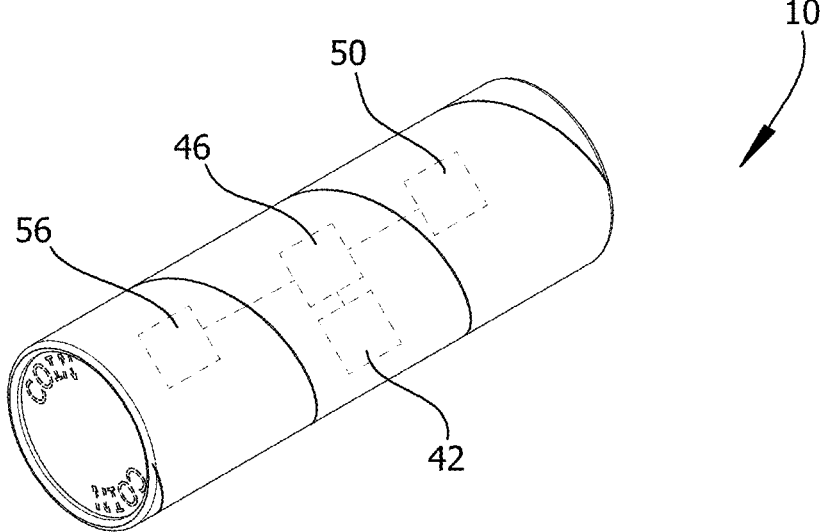
FIG. 2 is a top perspective view of an embodiment of the disclosure.
Figure 2:
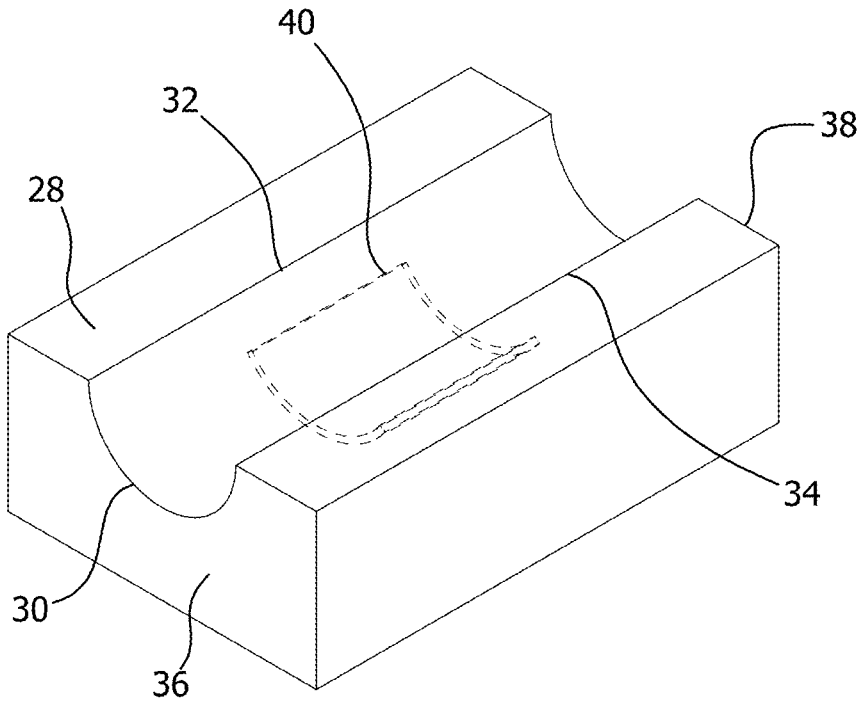
Figure 3:
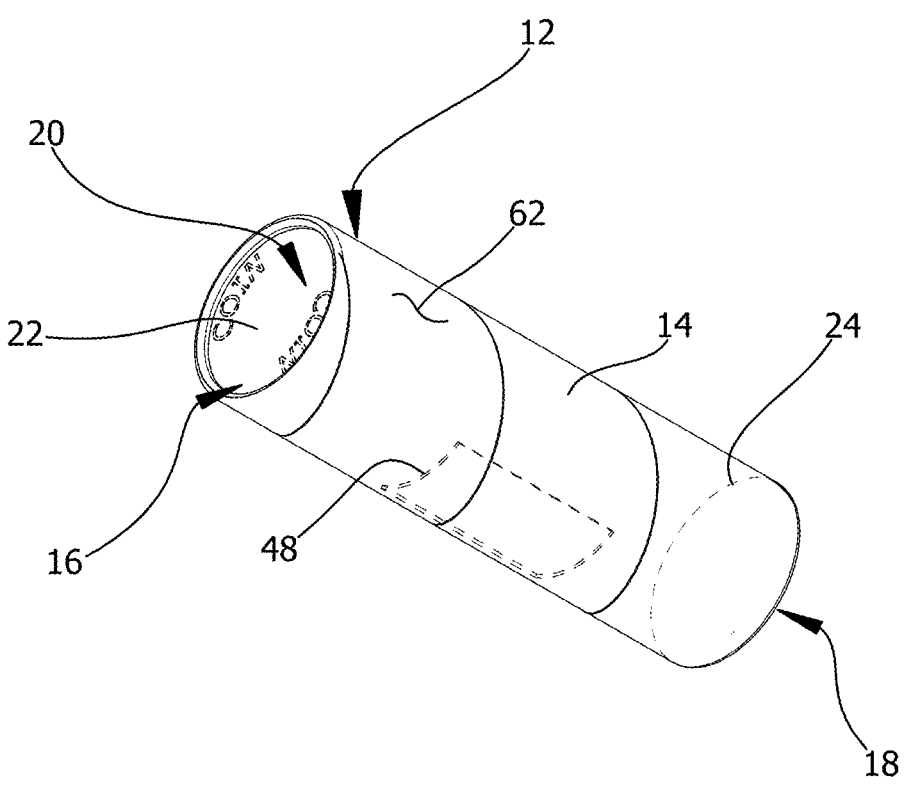
FIG. 3 is a bottom perspective view of an embodiment of the disclosure.
Figure 3:
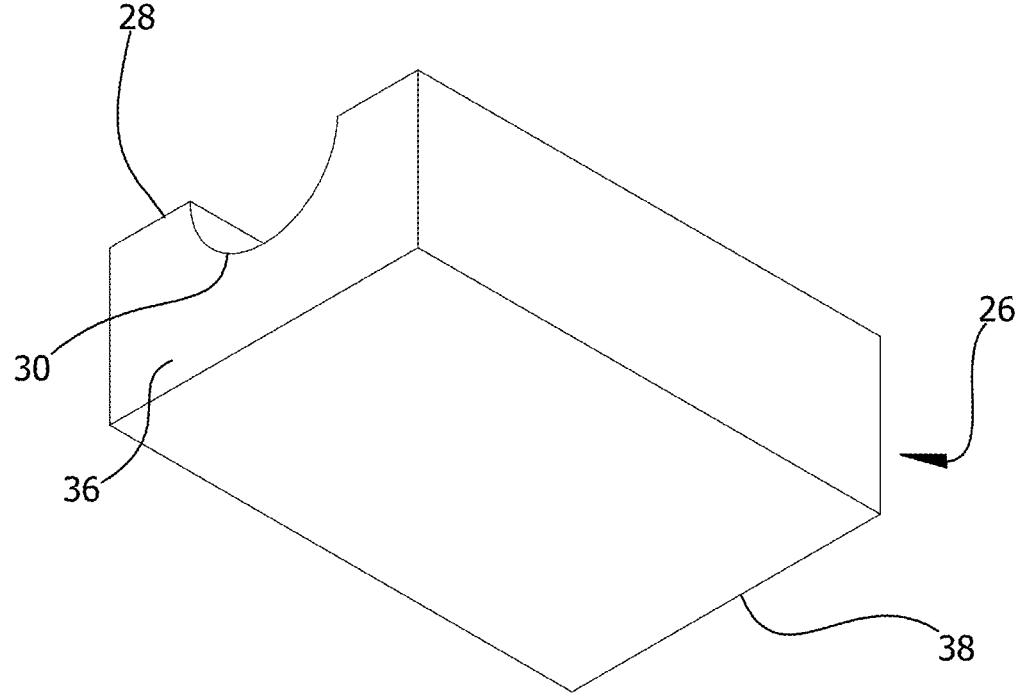
Figure 4:
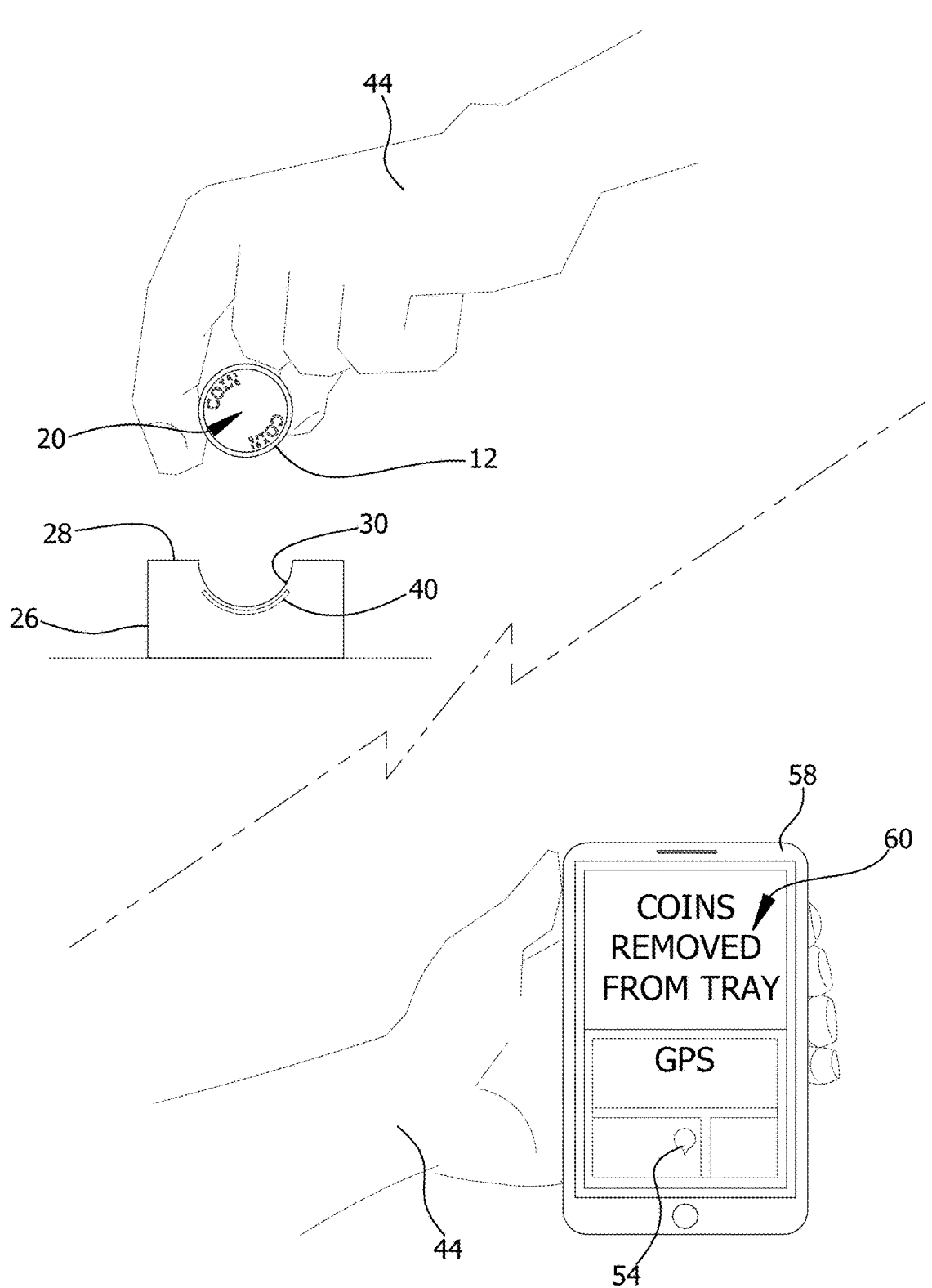
FIG. 4 is an in-use view of an embodiment of the disclosure.
Figure 5:
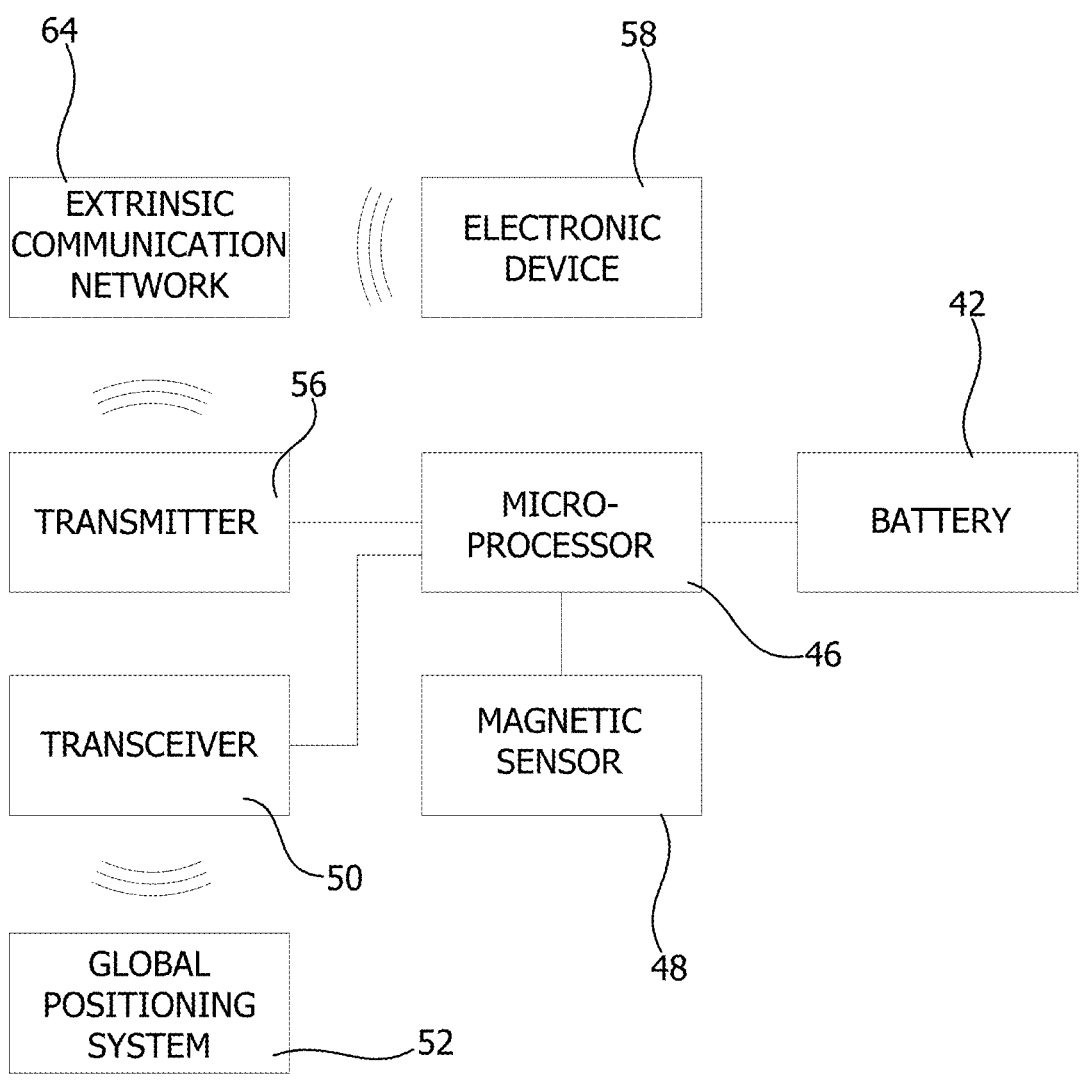
FIG. 5 is a block diagram view of an embodiment of the disclosure.

With reference now to the drawings, and in particular to FIGS. 1 through 5 thereof, a new tracking system embodying the principles and concepts of an embodiment of the disclosure and generally designated by the reference numeral 10 will be described.

As best illustrated in FIGS. 1 through 5, the coin anti-theft device 10 generally comprises a sleeve 12 having a peripheral wall 14 with an open first end 16 and an open second end 18. The sleeve 12 is generally cylindrical.

A plurality of coins 20 is positioned within the sleeve 12. For example, a first coin 22 may be positioned adjacent to the open first end 16 wherein the first coin 22 is positioned to cover the open first end 16. A second coin 24 may be positioned adjacent to the open second end 18 wherein the second coin 24 is positioned to cover the open second end 18.

A tray 26 may have a top wall 28 and a groove 30 that extends into the top wall 28. The groove 30 may have a groove first edge 32 and a groove second edge 34. The groove first edge 32 is generally parallel to and spaced from the groove second edge 34. The groove 30 is generally concavely arcuate between the groove first edge 32 and the groove second edge 34 wherein the sleeve 12 is positionable in the groove 30 between the groove first edge 32 and the groove second edge 34.

The tray 26 may have a primary end 36 and a secondary end 38. The primary end 36 may be perpendicular to the groove first edge 32. The primary end 36 may be parallel to the secondary end 38. The groove 30 may extend through the primary end 36 and the secondary end 38.

A magnet 40 may be positioned within the tray 26. The magnet 40 may be positioned adjacent to the top wall 28 wherein the magnet 40 is configured to magnetically engage the sleeve 12. The magnet 40 may be centrally positioned between the groove first edge 32 and the groove second edge 34. The magnet 40 may be centrally positioned between the primary end 36 and the secondary end 38 of the tray 26 wherein the magnet 40 is centrally positioned relative to the sleeve 12 when the sleeve 12 is positioned in the groove 30 on the tray 26.

The tray 26 may have a tray length that is equal to a sleeve length of the sleeve 12. The tray length of the tray 26 is generally measured between the primary end 36 and the secondary end 38. The sleeve length of the sleeve 12 is generally measured between the open first end 16 and the open second end 18. In embodiments where the tray length is equal to the sleeve length, the open first end 16 of the sleeve 12 may be positioned adjacent to the primary end 36 of the tray when the sleeve 12 is positioned in the groove 30. In other embodiments, the tray length may be less than or greater than the sleeve length, as long as the tray length is great enough to retain the sleeve 12 within the groove 30 and as long as the tray length is equal to or greater than a length of the magnet 40.

A power source 42 may be positioned within the sleeve 12. The power source 42 is generally positioned between the first coin 22 and the second coin 24 wherein the power source 42 is configured to be inhibited from view of a user 44. The power source 42 may be a battery.

A processor 46 may be electrically coupled to the power source 42. The processor 46 is positioned within the sleeve 12. For example, the processor 46 may be positioned between the first coin 22 and the second coin 24 wherein the processor 46 is configured to be inhibited from the view of the user 44.

An electromagnetic switch 48 may be electrically coupled to the processor 46. The electromagnetic switch 48 is generally actuatable to turn the processor 46 on and off. For example, the electromagnetic switch 48 may be magnetically attracted to the magnet 40 wherein the electromagnetic switch 48 is turned on when the sleeve 12 is positioned in the groove 30 and wherein the electromagnetic switch 48 is turned off when the sleeve 12 is removed from the groove 30 of the tray 26. In such embodiments, the processor 46 may be turned off when the electromagnetic switch 48 is turned on wherein the processor 46 is inhibited from drawing power from the power source 42 when the electromagnetic switch 48 is turned on. The processor 46 may be turned on when the electromagnetic switch 48 is turned off wherein the electromagnetic switch 48 is configured to conserve power from the power source 42 until the sleeve 12 is removed from the tray 26.

The electromagnetic switch 48 may be centered between the open first end 16 and the open second end 18 of the sleeve 12 wherein the electromagnetic switch 48 is alignable with the magnet 40 when the sleeve 12 is positioned in the groove 30 on the tray 26. The electromagnetic switch 48 may be positioned proximate to an outer surface 62 of the peripheral wall 14 of the sleeve 12 whereby the magnet 40 is configured to magnetically engage the sleeve 12 when the sleeve 12 is positioned in the groove 30 on the tray 26. The electromagnetic switch 48 is generally positioned within the sleeve 12 between the first coin 22 and the second coin 24 wherein the electromagnetic switch 48 is configured to be inhibited from view of the user 44.

A global positioning system transceiver 50 may be electrically coupled to the processor 46. The global positioning system transceiver 50 is generally configured to wirelessly communicate with a global positioning system unit 52 wherein the global positioning system transceiver 50 is configured to identify a geographic location 54 of the sleeve 12. The global positioning system transceiver 50 is generally positioned within the sleeve 12 between the first coin 22 and the second coin 24 wherein the global positioning system transceiver 50 is configured to be inhibited from view of the user 44.

A wireless communication transmitter 56 may be electrically coupled to the processor 46. The wireless communication transmitter 56 is generally configured to wirelessly communicate with an electronic device 58. For example, the wireless communication transmitter 56 may be configured to send an alert 60 to the electronic device 58 when the sleeve 12 is removed from the tray 26. In another example, the wireless communication transmitter 56 is configured to send the geographic location 54 of the sleeve 12 to the electronic device 58.

The wireless communication transmitter 56 may wirelessly communicate with the electronic device 58 via an extrinsic communications network 64, such as a cellular data network or an internet network. The extrinsic communications network 64 may facilitate the wireless communication transmitter 56 in sending the alert 60 and the geographic location 54 of the sleeve to a plurality of electronic devices. In preferred embodiments, the wireless communication transmitter 56 is configured to enable long range wireless communication with the extrinsic communications network 64 and the electronic device 58 wherein the wireless communication transmitter 56 and the global positioning system transceiver 50 are configured to facilitate a user 44 in finding the sleeve 12 when the sleeve 12 is removed from the tray 26 after a theft or robbery.

In use, the user 44 may lift the sleeve 12 from the tray 26 during a robbery and give the sleeve 12 to the robber. The plurality of coins 20 may comprise legitimate coin currency, such as quarters or dollar coins, wherein the sleeve 12 is disguised as a legitimate roll of coins. Once the sleeve 12 is lifted from the tray 26, the electromagnetic switch 48 will turn off and the processor 46 will turn on. The wireless communication transmitter 56 may send the alert 60 to the electronic device 58, notifying the user 44, an employer of the user 44, or a law enforcement official that the robbery has occurred. The global positioning system transceiver 50 will track the geographic location 54 of the sleeve 12, following the movement of the robber while the robbers retain possession of the sleeve 12. The wireless communication transmitter 56 can transmit the geographic location 54 to the electronic device 58 so that the geographic location 54 is visible to the user 44 in real time. The user 44 may share the geographic location 54 with law enforcement to facilitate apprehension of the robber.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An anti-theft assembly comprising:
a sleeve having an open first end and an open second end;
a plurality of coins being positioned within the sleeve, the plurality of coins including:
a first coin being positioned adjacent to the open first end wherein the first coin is positioned to cover the open first end; and
a second coin being positioned adjacent to the open second end wherein the second coin is positioned to cover the open second end;
a processor being positioned within the sleeve;
a global positioning system transceiver being electrically coupled to the processor, the global positioning system transceiver being configured to wirelessly communicate with a global positioning system unit wherein the global positioning system transceiver is configured to identify a geographic location of the sleeve; and
a wireless communication transmitter being electrically coupled to the processor, the wireless communication transmitter being configured to wirelessly communicate with an electronic device wherein the wireless communication transmitter is configured to send the geographic location of the sleeve to the electronic device.

2. The anti-theft assembly of claim 1, wherein the processor is positioned between the first coin and the second coin wherein the processor is configured to be inhibited from view of a user, the global positioning system transceiver being positioned between the first coin and the second coin wherein the global positioning system transceiver is configured to be inhibited from view of the user, and the wireless communication transmitter being positioned between the first coin and the second coin wherein the wireless communication transmitter is configured to be inhibited from view of the user.

3. The anti-theft assembly of claim 1, further comprising a tray having a top wall and a groove extending into the top wall, the groove having a groove first edge and a groove second edge, the groove being concavely arcuate between the groove first edge and the groove second edge wherein the sleeve is positionable in the groove between the groove first edge and the groove second edge.

4. The anti-theft assembly of claim 3, wherein the tray has a length being equal to a length of the sleeve.

5. The anti-theft assembly of claim 3, wherein the wireless communication transmitter is configured to send an alert to the electronic device when the sleeve is removed from the tray.

6. The anti-theft assembly of claim 3, further comprising:
a magnet being positioned within the tray, the magnet being centrally positioned between the groove first edge and the groove second edge; and
an electromagnetic switch being electrically coupled to the processor, the electromagnetic switch being actuatable to turn the processor on and off, the electromagnetic switch being magnetically attracted to the magnet wherein the electromagnetic switch is turned on when the sleeve is positioned in the groove and wherein the electromagnetic switch is turned off when the sleeve is removed from the groove of the tray.

7. The anti-theft assembly of claim 6, wherein the processor is turned off when the electromagnetic switch is turned on wherein the processor is inhibited from drawing power from the power source when the electromagnetic switch is turned on.

8. The anti-theft assembly of claim 6, further comprising a power source being positioned within the sleeve, the processor being electrically coupled to the power source, the processor being turned on when the electromagnetic switch is turned off wherein the electromagnetic switch is configured to conserve power from the power source until the sleeve is removed from the tray.

9. The anti-theft assembly of claim 6, the tray further comprising a primary end and a secondary end being perpendicular to the groove, the sleeve further comprising an open first end and an open second end, the magnet being centered between the primary end and the secondary end of the tray, the electromagnetic switch being centered between the open first end and the open second end of the sleeve wherein the electromagnetic switch is alignable with the magnet when the sleeve is positioned in the groove on the tray.

10. The anti-theft assembly of claim 6, wherein the electromagnetic switch is positioned proximate to an outer surface of the sleeve wherein the electromagnetic switch is configured to be magnetically couplable to the magnet when the sleeve is positioned in the groove on the tray.

11. An anti-theft assembly comprising:
a sleeve having a peripheral wall with an open first end and an open second end, the sleeve being cylindrical;
a plurality of coins being positioned within the sleeve, the plurality of coins including:
a first coin being positioned adjacent to the open first end wherein the first coin is positioned to cover the open first end;
a second coin being positioned adjacent to the open second end wherein the second coin is positioned to cover the open second end;
a tray having a top wall and a groove extending into the top wall, the groove having a groove first edge and a groove second edge, the groove being concavely arcuate between the groove first edge and the groove second edge wherein the sleeve is positionable in the groove between the groove first edge and the groove second edge, the tray having a length being equal to a length of the sleeve, the tray having a primary end and a secondary end, the length of the tray being measured between the primary end and the secondary end, the primary end being perpendicular to the groove first edge, the primary end being parallel to the secondary end;

a magnet being positioned within the tray, the magnet being positioned adjacent to the top wall, the magnet being centrally positioned between the groove first edge and the groove second edge, the magnet being centrally positioned between the primary end and the secondary end of the tray wherein the magnet is centrally positioned relative to the sleeve when the sleeve is positioned in the groove on the tray;

a power source being positioned within the sleeve, the power source being positioned between the first coin and the second coin wherein the power source is configured to be inhibited from a view of a user, the power source being a battery;

a processor being electrically coupled to the power source, the processor being positioned within the sleeve between the first coin and the second coin wherein the processor is configured to be inhibited from the view of the user;

an electromagnetic switch being electrically coupled to the processor, the electromagnetic switch being actuatable to turn the processor on and off, the electromagnetic switch being magnetically attracted to the magnet wherein the electromagnetic switch is turned on when the sleeve is positioned in the groove and wherein the electromagnetic switch is turned off when the sleeve is removed from the groove of the tray, the processor being turned off when the electromagnetic switch is turned on wherein the processor is inhibited from drawing power from the power source when the electromagnetic switch is turned on, the processor being turned on when the electromagnetic switch is turned off wherein the electromagnetic switch is configured to conserve power from the power source until the sleeve is removed from the tray, the electromagnetic switch being centered between the open first end and the open second end of the sleeve wherein the electromagnetic switch is alignable with the magnet when the sleeve is positioned in the groove on the tray, the electromagnetic switch being positioned proximate to the peripheral wall of the sleeve wherein the electromagnetic switch is configured to be magnetically engageable with the magnet when the sleeve is positioned in the groove on the tray, the electromagnetic switch being positioned within the sleeve between the first coin and the second coin wherein the electromagnetic switch is configured to be inhibited from view of the user;

a global positioning system transceiver being electrically coupled to the processor, the global positioning system transceiver being configured to wirelessly communicate with a global positioning system unit wherein the global positioning system transceiver is configured to identify a geographic location of the sleeve, the global positioning system transceiver being positioned within the sleeve between the first coin and the second coin wherein the global positioning system transceiver is configured to be inhibited from view of the user; and a wireless communication transmitter being electrically coupled to the processor, the wireless communication transmitter being configured to wirelessly communicate with an electronic device wherein the wireless communication transmitter is configured to send an alert to the electronic device when the sleeve is removed from the tray and wherein the wireless communication transmitter is configured to send the geographic location of the sleeve to the electronic device.

* * * * *